United States Patent [19]

Ohtake et al.

[11] Patent Number: 4,551,389
[45] Date of Patent: Nov. 5, 1985

[54] POROUS SPHERICAL CELLULOSE ACETATE PARTICLES

[75] Inventors: Etsuo Ohtake, Yokohama; Kazuhiro Yamazaki, Hyogo, both of Japan

[73] Assignee: Daicel Chemical Industries, Ltd., Osaka, Japan

[21] Appl. No.: 693,720

[22] Filed: Jan. 23, 1985

[30] Foreign Application Priority Data

Mar. 21, 1984 [JP] Japan ................................ 59-54004

[51] Int. Cl.$^4$ .......................... B32B 5/14; B32B 5/16; B32B 9/00
[52] U.S. Cl. ..................................... 428/402; 428/403

[58] Field of Search ................................ 428/402, 403

[56] References Cited

U.S. PATENT DOCUMENTS 3,837,989  9/1974  McCoy ................................ 428/402

Primary Examiner—William J. Van Balen
Attorney, Agent, or Firm—Flynn, Thiel, Boutell & Tanis

[57] ABSTRACT

Cellulose acetate is formed into porous, spherical particles, having an acetylation degree of 49 to 60%, a particle diameter of 0.05 to 10 mm, a sphericity of 0.7 or larger, a pore volume of 0.4 cc/g or larger and a collapsing strength of 9 kg or higher.

6 Claims, No Drawings

POROUS SPHERICAL CELLULOSE ACETATE PARTICLES

The invention relates to particles of cellulose acetate and then a process for preparing the same. Cellulose acetate which the invention especially concerns has a combined acetic acid, or an acetylation degree, of 49 to 60%, which corresponds to an esterification degree of 2.0 to 2.8.

Cellulose acetate is known to have moldability and solubility in a common organic solvent such as acetone, acetic acid and ethyl acetate. For this reason it has been used in the form of chips, flakes, powder, fiber, film or mold articles.

While moldings of cellulose acetate are excellent in properties including transparency, dyeability, touch, impact strength, etc., this material itself exhibits properties such as adsorptivity, liquid retentivity, and easy wettability of its surface. Therefore, if particles that are both porous and spherical can be obtained from it, these particles will be useful as enzyme carriers, chromatographic packings, slow-releasing adsorbents for perfuming agents, deodorants, medicines or agricultural chemicals, and ion exchangers. The reason why spherical particles are advantageous is that they have good fluidity as compared with particles of other shapes. For example, spherical particles carrying an enzyme give a good efficiency of contact with a reaction solution when they are used in a packed bed, a fluidized bed, or an agitation tank. In this case, it is desirable that disintegration or deformation of particles does not occur even when the height of the packed bed is increased or when a pressure or an impact of the blade of the agitation tank is exerted on the particles. The disintegration or deformation of the particles in a packed bed results in the formation of unevenly dense portions and causes an uneven flow of a reaction solution and a lowered reaction efficiency. Therefore, the particles must be those which are tough enough to withstand compression or impact.

On the other hand, the particles must have a large pore volume because the amount of an enzyme or a drug fixed or an adsorbed thereon is proportional to the pore volume within the particles. Particles of a large pore volume necessarily have a small specific gravity. In general, the requirement that particles should have a small specific gravity or density is contradictory to the requirement that they should have sufficient toughness and, therefore, none of the prior arts has succeeded in meeting both of these requirements.

As a result of extensive studies, the inventors of the present invention have succeeded in producing porous spherical particles having a good sphericity, a toughness, and a large pore volume by using cellulose acetate as a starting material.

According to the invention, cellulose acetate is formed into porous, spherical particles, having an acetylation degree of 49 to 60%, a particle diameter of 0.05 to 10 mm, a sphericity of 0.7 or larger, a pore volume of 0.4 cc/g or larger and a collapsing strength of 9 kg or higher.

In a preferable embodiment, a sphericity is 0.8 or greater, a pore volume is 0.65 cc/g or greater and a degree of esterification is 2.0 to 2.8.

In addition, the invention includes an improvement that the surface of the above defined particles has been saponified. This surface-saponified particles have the surface portion consisting essentially of cellulose and the core portion consisting essentially of cellulose acetate, having an acetylation degree of 48 to 59%, a particle diameter of 0.05 to 10 mm, a sphericity of 0.7 or greater, a pore volume of 0.4 cc/g or greater and a collapsing strength of 10 kg or higher.

In a more preferable embodiment of the surface-saponified particles, an acetylation degree of 50 to 58% and a particle diameter is 0.5 to 10 mm.

The process for producing spherical particles according to the present invention is the so-called "precipitation process". This process consists in using a solution of a high-molecular substance as a dope; adding said dope to a bath comprising a medium in which the high-molecular substance is not soluble but the solvent of said solution is soluble, that is, a coagulation bath; and applying thereto a shearing force to form particles while precipitating the high-molecular substance by solvent removal.

In the present invention, acetic acid/water mixtures are used as the solvent for a cellulose acetate solution, that is, a dope, and the medium for a coagulation bath. The solvent for the dope has a composition of an acetic acid to water ratio of 80/20 to 90/10 (by weight; the same applies hereinafter), and the medium for the coagulation bath has a composition of an acetic acid to water ratio of 30/70 to 42/58.

The dope is prepared by dissolving a cellulose acetate of a degree of esterification of 2.0 to 2.8 in the above solvent for a dope so that the concentration of the cellulose acetate may be 25±7% (by weight; the same applies hereinafter), preferably about 25%. It is preferable that the viscosity of the dope is about 2,000 poises at 40° C. A supply pipe leads from a dope tank to a coagulation bath, and a nozzle on one end of the supply pipe is submerged in the coagulation bath. The coagulation bath is provided with an agitator having blades thereon. Each of the blades has a cutting edge on the front side to pass near the holes of the nozzle and cut a rod-like continuous body of the dope which is extruded from the holes of the nozzle and is coagulating. The cut fine pieces form spherical particles while they are precipitating and coagulating.

Since the acetic acid concentration of the acetic acid/water solution brought in by the dope during continued performance of the precipitation and coagulation is higher than the initial acetic acid concentration of the coagulation bath, it is necessary to maintain the acetic acid to water ratio of the coagulation bath constant by adding such an amount of water as to counterbalance the acetic acid brought in. This addition of water makes it possible to keep the concentration gradient of particle/medium constant to thereby afford uniform particles continuously.

The size of particles obtained by this process depends on a nozzle hole diameter, a feed rate of a dope, an agitator speed, etc., and the sphericity is improved when the feed rate and the agitator speed are set such that the cut length of the rotor may be nearly equal to the nozzle hole diameter. Particles having a particle diameter in the range of 0.05 to 10 mm are practical. Those having a particle diameter of less than 0.05 mm show a poor efficiency of production, while those having a particle diameter exceeding 10 mm can difficultly acquire an excellent sphericity or a pore volume.

In the process of the present invention, it is also possible to use an aged dope formed in the step of producing a cellulose acetate having a degree of esterification of 2.0 to 2.8 directly as the dope for the precipitation step. Namely, while this cellulose is one which is obtained by saponifying and aging cellulose triacetate by treatment with an acetic acid/water solvent, the reaction solution at the time of completion of the aging is called aged dope, because it is in a state in which a cellulose acetate of a degree of esterification of 2.0 to 2.8 is dissolved in a highly concentrated aqueous acetic acid solution, and has a viscosity of as high as about 1,000 to 3,000 poises. The separating and recovering step of cellulose acetate from the aged dope is the so-called "precipitation step". It is to be noted that the aged dope usually contains an inorganic salt, e.g., magnesium sulfate, which is a product of neutralization of a catalyst (usually, sulfuric acid) used in the acetylation reaction. If such a water-soluble salt is present in a large amount, the size of the internal pores will tend to increase in the precipitation step, thus reducing the pore volume. Therefore, it is preferable that the salt content of the aged dope when it is sent to the precipitation step is 1.5% or below. The salt content depends on the conditions of the acetylation step, that is, on the amount of a catalyst used, so that it is necessary to choose conditions including a smaller amount of catalyst used. Such a process for the acetylation under conditions of a smaller amount of a catalyst is described, for example, in Japanese Patent Laid-Open No. 59801/1981.

The particles according to the process of the present invention are thought to be formed in such a manner that a tough shell portion is formed during a relatively early period of the precipitation step and then a thick aqueous acetic acid solution held within the particles is replaced with a relatively thin aqueous acetic acid solution in the coagulation bath, during which time the internal pores are formed. Namely, it may be presumed that the tough shell is formed on an interface of a relatively large concentration gradient and, thereafter, the replacement of the solvents at a relatively smaller concentration difference proceeds within the particles, and passages left after the highly concentrated aqueous acetic acid solution has passed from internal pores.

Although, as can be seen from the above, the structure of a particle is established almost completely in the precipitation step, the particles still contain a large amount of acetic acid within them. These particles are centrifugally separated from the solution, subjected to a washing treatment in a water bath and then dried. The acetic acid remaining within the particles is replaced with water in the washing step, so that the structure of a particle is affected somewhat by the conditions of the washing step. Namely, it is preferable that the washing is carried out with water of 40° to 90° C. Particles of a larger pore volume can be obtained if the above treatment is carried out at a higher temperature.

The spherical particles of the present invention are extremely tough and have a large pore volume, so that they are highly suited for use in packings, carriers, adsorbents, etc. Further, because of the toughness of their shells, the particles can be used also in the production of sintered bodies.

When the particles must have surfaces which are more hydrophilic than those of the cellulose acetate, or when the particles are used in contact with a medium which dissolves, swells, or plasticizes the cellulose acetate, they are used in the form of regenerated cellulose particles which can be obtained by saponifying the cellulose acetate particles with an alkali. This saponification may be effected to such an extent that only the surface are saponified or that the particles are completely saponified. It is also possible to obtain hollow particles of regenerated cellulose by saponifying only the surface and treating the particles with a solvent which dissolves cellulose acetate.

The surface-saponified particles of the invention are prepared by soaking the porous, spherical particles of cellulose acetate as disclosed above with an aqueous solution of sodium hydroxide having a concentration of 0.2 to 2 wt. % for 1 to 6 minutes at a ratio of liquid to solid in the range between 3 and 10.

The comparison between the particles before the surface saponification of the present invention and those after the surface saponification of the present invention has revealed that the particle diameter and the sphericity are somewhat reduced and the pore volume is also reduced, but that the collapsing strength is somewhat increased in some cases, or decreased in other cases. It was also found that a content of combined acetic acid representative of the composition was kept at 95% or above, suggesting that only a small portion of each particle was saponified.

It is doubtless that the saponification occurs on only the very surfaces of particles in view of the fact that the surfaces of the particles after the saponification treatment are modified and a high content of combined acetic acid is maintained as mentioned above. The reason why the saponification cannot be attained except on the surfaces through the particles before saponification are porous and have excellent impregnatability may be that the aqueous alkali solution which is used in the present invention imparts moderate swellability to the surfaces of the particles to be treated, and this prevents the alkali from infiltrating into the insides of the particles. It is presumed that this surface-swollen layer is reconverted into a layer which is porous yet dense, when the treated particles are washed with water and dried.

The surface-saponified porous spherical cellulose acetate particles of the present invention have the same applications as those of the porous spherical cellulose acetate particles before the surface saponification, and have a particularly excellent effect of impregnation and release of polar substances.

Although the present invention relates to surface-saponified porous spherical cellulose acetate particles and to a process for producing the same, it is also possible to produce surface-saponified porous spherical particles of lower fatty acid cellulose esters, such as cellulose propionate and cellulose butyrate, as substitutes for cellulose acetate, by a similar and to use these in similar applications.

The present invention will be described with reference to an example, but it should be noted that the present invention is by no means limited thereto.

EXAMPLE 1

A ripening dope containing a cellulose diacetate concentration of 25%, a magnesium sulfate concentration of 0.9% and a viscosity at 40° C. of 2,100 poises was added to a coagulation bath of a composition of an acetic acid to water ratio of 40/60 to effect precipitation and granulation. The apparatus was operated by using a nozzle diameter of 3 mm, a revolution speed of a three-blade agitator of 1,000 rpm, and a coagulation bath temperature of 40° C. to obtain spherical precipitated particles. The particles were centrifugally separated, washed with water of 60° C., and dried.

The physical properties of the particles were measured according to the following methods.

Sphericity:
20 particles were taken up at random and the largest and smallest diameters of each particle were measured with a micrometer. The sphericity was determined according to the following equation.

$$\text{sphericity} = \frac{\Sigma \text{ smallest diameter/largest diameter}}{20}$$

Pore volume:
A mercury porosimeter (a product of Carlo Erba) was used. The volume of mercury intruded into the pores at a pressure in the range of 0 to 1,000 (kg/cm$^2$ G) corresponded to a volume of pores in the range of 75 to 75,000 (Å). The pore volume is represented in terms of cc per one gram of the sample.

Collapsing strength:
A Monsanto tablet hardness tester (a product of Oiwa Medical Machine Manufacturing Co., Ltd.) was used. An average of the measured values of 10 particles was calculated.

The determined values of the produced spherical particles are as follows:

| | |
|---|---|
| sphere diameter | 3.5  4.0 mm |
| sphericity | 0.82 |
| pore volume | 0.81 cc/g |
| collapsing strength | 11.1 kg. |

Content of combined acetic acid:
About 5 g of a powdered sample were dried in a dryer at 100° to 105° C. for 2 hours, and weighed accurately. 50 cc of purified acetone were added to this sample and the mixture was dissolved completely. 50 cc of a 0.2N aqueous NaOH solution and 50 cc of a 0.2N aqueous HCl solution were added thereto in sequence. The resulting solution was titrated with a 0.2N aqueous NaOH solution by using phenolphthalein as an indicator. The degree of acetylation was calculated according to the following equation:

$$\text{combined acetic acid (\%)} = \frac{(A - B) \times F \times 1.201}{\text{weight (g) of sample}} \times 100$$

wherein
A: volume (cc) of 0.2N aqueous NaOH solution
B: volume (cc) of 0.2N aqueous NaOH solution added in a blank test
F: factor of 0.2N aqueous NaOH solution In the invention, a combined acetic acid or a content of combined acetic acid which is determined in the above shown manner is called also as an acetylation degree. This may be calculated to an esterification degree.

EXAMPLE 2

1,000 g of porous spherical particles comprising cellulose acetate of a degree of acetylation of 54.5% (a product of Daicel Chemical Industries, Ltd.), and having an average particle diameter of 3.6 mm, a sphericity of 0.87, a collapsing strength of 15 kg, and a pore volume of 0.68 cc/g were immersed in 500 cc of a 1% aqueous solution of sodium hydroxide at the room temperature for 3 minutes. After centrifugally separating the solution, the particles were washed with warm water of 40° C. until the washing became neutral, and then dried in a dryer at 100° to 110° C. for 3 hours to obtain surface-saponified porous spherical particles. These Particles had an average degree of acetylation of 53.4%, an average particle diameter of 3.2 mm, a sphericity of 0.82, a pore volume of 0.43 cc/g, and a collapsing strength of 17 kg.

EXAMPLE 3

100 g of porous spherical particles comprising cellulose acetate of a degree of acetylation of 55.2% (a product of Daicel Chemical Industries, Ltd.), and having an average particle diameter of 5.3 mm, a sphericity of 0.90, a collapsing strength of 14 kg, and a pore volume of 0.75 cc/g were immersed in 500 cc of a 0.5% aqueous solution of sodium hydroxide and treated in the same manner as that in Example 2 to obtain surface-saponified porous spherical particles. These particles had an average content of combined acetic acid of 54.5%, an average particle diameter of 5.1 mm, a sphericity of 0.85, a pore volume of 0.51 cc/g, and a collapsing strength of 15 kg.

APPLICATION EXAMPLE 2 g of bergamot oil (linalyl acetate content of 40%) were added to 10 g of the surface-saponified spherical particles obtained in Example 2 and the mixture was agitated. After about 10 minutes, the liquid was completely impregnated, and the surfaces of the particles became dry and nonsticky. Separately, the spherical particles before surface saponification used in Example 2 were impregnated with a perfume by a similar treatment. The surfaces of the particles were sticky and tended to stick to each other.

On the contrary, when the surface-saponified spherical particles which were obtained in Example 2 and impregnated with a perfume were stored at 80° C., their surfaces did not become sticky.

The evaporation rate of the perfume in an open air at a room temperature was determined. 10 days were necessary for 50% evaporation, and 45 days were necessary for 90% evaporation. This suggested an excellent effect of slow releasing.

The embodiments of the invention in which an exclusive property or privilege is claimed are defined as follows:

1. Porous, spherical particles of cellulose acetate, which consist essentially of a cellulose acetate having
   an acetylation degree of 49 to 60%,
   a particle diameter of 0.05 to 10 mm,
   a sphericity of 0.7 or larger,
   a pore volume of 0.4 cc/g or larger and
   a collapsing strength of 9 kg or higher.

2. Porous, spherical particles as claimed in claim 1, the surface of which has been saponified.

3. Porous, spherical particles as claimed in claim 2, in which the surface of the particles consists essentially of cellulose and the core of the particles consists essentially of cellulose acetate having
   an acetylation degree of 48 to 59%,
   a particle diameter of 0.05 to 10 mm,
   a sphericity of 0.7 or greater,
   a pore volume of 0.4 cc/g or greater and
   a collapsing strength of 10 kg or higher.

4. A process for preparing surface-saponified, porous, spherical particles of cellulose acetate, which comprises the step of soaking the porous, spherical particles as defined in claim 1 in an aqueous sodium hydroxide solution having a concentration of 0.2 to 2 wt. % for 1 to 6 minutes at a ratio of liquid to solid in the range between 3 and 10.

5. A process as claimed in claim 4 in which the product is particles having
 an acetylation degree of 48 to 59%,
 a particle diameter of 0.05 to 10 mm,
 a sphericity of 0.7 or greater,
 a pore volume of 0.4 cc/g or greater and
 a collapsing strength of 10 kg or higher.

6. Porous, spherical particles as claimed in claim 3, in which the acetylation degree is 50 to 58% and the particle diameter is 0.5 to 10 mm.

* * * * *